United States Patent [19]
Dyachkov

[11] 3,856,133
[45] Dec. 24, 1974

[54] ENDLESS BELT CONVEYOR

[76] Inventor: Vladimir Konstantinovich Dyachkov, ulitsa Chkalova, 41/2, kv. 1, Moscow, U.S.S.R.

[22] Filed: Dec. 26, 1972

[21] Appl. No.: 318,276

[52] U.S. Cl.................. 198/182, 198/184, 198/230
[51] Int. Cl............................................ B65g 15/28
[58] Field of Search .......... 198/182, 184, 187, 204, 198/181, 230

[56] References Cited
FOREIGN PATENTS OR APPLICATIONS
| | | | |
|---|---|---|---|
| 1,150,417 | 1/1958 | France................................ | 198/184 |
| 565,817 | 11/1958 | Canada.............................. | 198/187 |
| 1,207,271 | 12/1965 | Germany............................ | 198/182 |

*Primary Examiner*—Richard A. Schacher
*Assistant Examiner*—Richard K. Thomson
*Attorney, Agent, or Firm*—Holman & Stern

[57] ABSTRACT

An endless belt conveyor is disclosed the path of which has rectilinear and curvilinear sections in a horizontal plane. The carrying and return strands of the conveyor endless belt are supported by idlers. The idlers which support the return strand of the endless belt in the curvilinear sections of the conveyor path are positioned so as to gradually change the position of the endless belt from horizontal to vertical and, in reverse, which makes it possible to decrease the radius of turn of the belt return strand in the curvilinear sections of the conveyor path and enables the belt to steadily run true on the idlers in these curvilinear sections.

3 Claims, 4 Drawing Figures

ENDLESS BELT CONVEYOR

BACKGROUND OF THE INVENTION

This invention relates generally to conveyors more particularly, it relates to endless belt conveyors the path of which has rectilinear and curvilinear sections in a horizontal plane.

Endless belt conveyors the paths of which have rectilinear and curvilinear sections in a horizontal plane are known in the art.

The carrying and return strands of the endless belt in such conveyors are supported by idlers mounted on bearers uniformly distributed throughout the length of the conveyor frame. The bearers of both the carrying and return idlers are positioned horizontally and the return idlers contact the belt face exposed to the load.

The endless belt conveyors referred to suffer from restricted suitability for use since they are made with the conveyor path curvature of a long (1,400 m) radius. Another disadvantage of such conveyors is that the return strand of the conveyor belt is likely to run untrue on the return idlers in the curvilinear sections of the conveyor path. The belt tension tends to shift the belt sideways from its desired position on the idlers, which results in damaged belt edges and, consequently, in impaired conveyor performance.

With the endless belt conveyors, the radius of belt turn in a horizontal plane (the radius of curvature) is determined essentially by the friction between the return strand of the conveyor belt and the return idlers. Weather conditions such as rain, snow, increase in humidity and so on and also accumulation of dirt on the conveyor belt face which is exposed to the load and contacts the return idlers engender abrupt diminishment and inconstancy of the friction between the conveyor belt and the idlers, which again affects conveyor performance.

SUMMARY OF THE INVENTION

It is an object of this invention to provide an endless belt conveyor the performance of which will not suffer from the adverse effects disclosed above.

A further object of this invention is to decrease the radius of the horizontal turns in the curvilinear sections of the conveyor path.

With these and other objects in view, there is provided an endless belt conveyor the path of which has rectilinear and curvilinear sections in a horizontal plane, the carrying and return strands of the endless belt being supported by idlers mounted on bearer which are installed on the conveyor frame. According to the invention, the axes of the idlers which support the return strand of the endless belt in the curvilinear sections of the conveyor path are positioned vertically, whereas the axes of the idlers supporting the return strand of the endless belt between the rectilinear and curvilinear sections of the conveyor path are positioned at an angle to the horizontal, the angle of inclination of each idler increasing progressively from zero to 90°, whereby the angular position of the endless belt is gradually changed from horizontal to vertical.

It is expedient that the idlers supporting the return strand of the endless belt between the rectilinear and curvilinear sections of the conveyor path be progressively inclined towards the center of the curvilinear section, whereby the belt face which is not exposed to the load will be brought in contact with the vertical idlers.

By enabling the idlers to contact the clean face of the endless belt, i.e., the face which is not exposed to the load, the possibility of load particles becoming lodged on the rollers is precluded, so that the belt will steadily run true on the idlers in the curvilinear sections of the conveyor path.

It is further expedient for the carrying strand of the endless belt to steadily run true on the supporting idlers in curvilinear sections with the radius of curvature below 500 m, that each bearer together with the supporting idlers installed thereon be mounted on the conveyor frame so that the bearer angular position can change in a vertical plane within the angle of repose of the load being handled, for which purpose the inward end of each bearer (the end nearer the center of the curvilinear section of the conveyor path) should be connected to the conveyor frame through a flexible element and thereby permitted to move up and down, the bearer outward end (the end remote from the center of the curvilinear section) being connected to the conveyor frame by means of a horizontal pivot.

This method of mounting the bearers with the idlers which support the carrying strand of the endless belt in the curvilinear sections of the conveyor path provides for belt stability with the radius of the curvature reduced and the conveyor operating under any load conditions.

In endless belt conveyors constructed according to this invention the radius of curvature of the horizontal curvilinear sections can be as small as 100 m and below, both the carrying and the return strands of the endless belt steadily running true on the idlers irrespective of possible changes in the coefficient of friction, which ensures positive belt conveyor performance on intricate conveyance paths comprising curvilinear sections and turns with small radii of curvature.

BRIEF DESCRIPTION OF THE DRAWING

Now an embodiment of the invention will be described with reference to the accompanying drawings in which.

DETAILED DESCRIPTION OF THE PREFERRED EMBODIMENT

Figure 1:
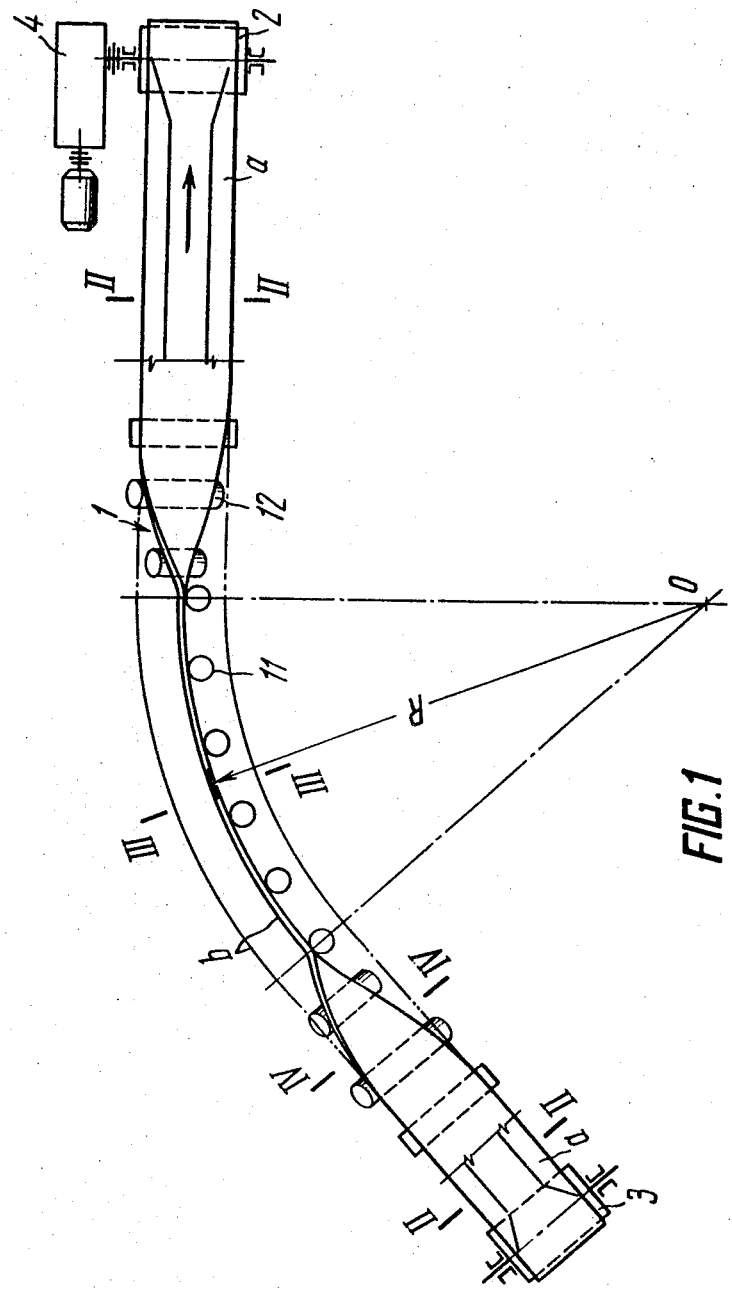
FIG. 1 shows a diagrammatic top view of an endless belt conveyor according to the invention, the carrying strand of the belt in the curvilinear section of the conveyor path being omitted for the sake of clarity.

The path of the endless belt conveyor consists of rectilinear sections $a$ (FIG. 1) and a curvilinear section $b$ with the radius R and the center O.

The conveyor path may consist of several rectilinear and curvilinear sections.

An endless belt 1 runs over end drums 2 and 3. The end drum 2 is connected to a drive 4. The take-up mechanism of the endless belt 1 is omitted from the drawing for the sake of clarity.

Figure 2:
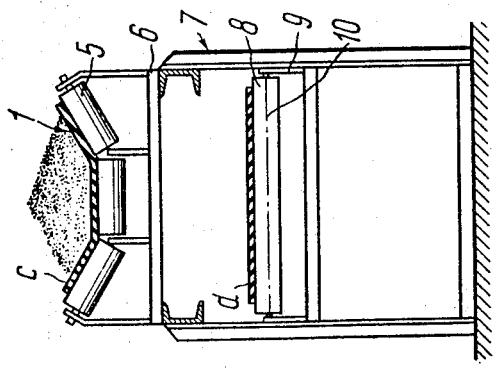
FIG. 2 is an enlarged sectional view taken along the line II—II of FIG. 1.

In the rectilinear sections a (FIG. 1) of the conveyor path the carrying strand c (FIG. 2) of the endless belt 1 is supported by idlers 5 which are positioned in a bearer 6 so that the belt 1 is troughed. The bearers 6 are mounted on a conveyor frame 7.

In the rectilinear sections a of the conveyor path, the return strand d of the endless belt 1 is supported by straight return idlers 8 which are carried by bearers 9 mounted on the conveyor frame 7.

These idlers are positioned with their axes 10 horizontal.

In the curvilinear section b of the conveyor path, the return strand d of the endless belt 1 is supported by straight return idlers 11 (FIG. 3) which are positioned with their axes 10 vertical. In the transition portion of the conveyor path between the rectilinear sections a and the curvilinear section b, the return strand d of the endless belt 1 is supported by straight return idlers 12 which are positioned at an angle with the horizontal. The angle $\alpha$ of the axis 10 of each idler 12 progressively increases from zero to 90°, whereby the endless belt 1 is gradually turned from a horizontal position in the rectilinear section a to a vertical position in the curvilinear section b.

The expedience of mounting the return idlers 11 in a vertical position enables the radius R of the belt turn in the curvilinear section b of the conveyor path to be materially reduced (the radius can be brought down to 100 m and below) and permits changing the radius R of the belt turn without regard to the limitations set by the friction between the contacting surfaces of the endless belt 1 and the return idlers 11. Further, the vertical position of the endless belt 1 in the curvilinear sections b of the conveyor path enables the belt bending stress to be considerably reduced and uniformly distributed through the entire cross-sectional area of the belt, the radius R of the belt turn being small, and also enables the endless belt 1 to steadily run true on the idlers 11, the behaviour of the belt being not influenced by weather conditions.

For the idlers 11 to contact the clean face of the endless belt 1, i.e., the face which is not exposed to the load, the axes 10 of the idlers 12 are inclined towards the center O of the curvilinear section b.

For the carrying strand c of the endless belt 1 to steadily run true on the supporting idlers 5 in the curvilinear section b of the conveyor path, the radius R of the conveyor path curvature being below 500 m and the conveyor operating under any load conditions, provision is made for inclining the carrying strand of the belt in a vertical plane, away from the center O of the conveyor path curvature.

Figure 3:
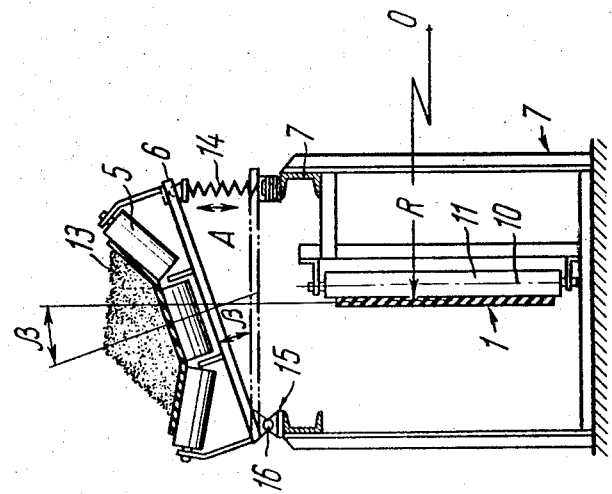
FIG. 3 is an enlarged sectional view taken along the line III—III of FIG. 3, the carrying strand of the belt being shown.
Figure 4:
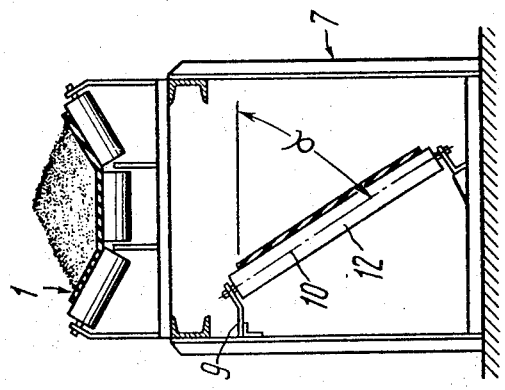
FIG. 4 is an enlarged sectional view taken along the line IV—IV of FIG. 1.

For this purpose, the bearer 6 with the supporting idlers 5 mounted thereon is installed on the conveyor frame 7 at an angle $\beta$ (FIG. 3) maintained within the angle of repose of the load 13 so that the latter will not be spilled. The angle $\beta$ in FIG. 3 is exaggerated for the sake of clarity.

Since the load carried by the endless belt 1 may vary over a substantial range between zero and a maximum, provision is made for maintaining belt stability under any load conditions. For this purpose, each bearer 6 has its inward end (the end nearer the center O of the curvilinear section b) connected to the conveyor frame 7 through a flexible element 14 the function of which in the present embodiment under consideration is fulfilled by a spring. In this way, the bearer inward end is enabled to move up and down as indicated by the arrows A. The opposite end of each bearer 6 is connected to the conveyor frame by a hinge 15 with a horizontal pivot 16.

The endless belt conveyor operates as follows:

The endless belt 1 receives motion from the drive 4. In the rectilinear sections a of the conveyor path, the carrying strand c of the endless belt 1 is supported by the idlers 5 which make the belt assume the shape of a trough, whereas the return strand d of the endless belt 1 is supported by the straight idlers 8. The bearers 6 and 9 which mount the idlers in the rectilinear sections a of the conveyor path are positioned horizontally.

At the approach to the curvilinear section b of the conveyor path, the return strand d of the endless belt 1 runs on the inclined idlers 12 and is thereby gradually turned from a horizontal position into a vertical position.

Since the idlers 12 are progressively inclined towards the center O of the conveyor path curvature, the endless belt 1 is turned so that its clean face (i.e., the face not exposed to the load) is brought in contact with the vertical idlers 11 in the curvilinear section b of the conveyor path.

The vertical position of the idlers 11 in the curvilinear sections b of the conveyor path enables the endless belt 1 to steadily run true irrespective of both the belt tension and the friction between the belt and the idlers. All these features enable the curvilinear sections b of the conveyor path to be made with the radius of curvature as small as 100 m and below.

In the curvilinear sections of the conveyor path, the belt tension tends to displace the carrying strand c of the endless belt 1 from the idlers 5 towards the center O of the conveyor path curvature, the displacing force increasing with a decrease in the radius R of the curvature. In order to enable the carrying strand c of the endless belt 1 to steadily run true on the idlers in the curvilinear section b of the conveyor path, the bearers 6 with the rollers 5 mounted thereon are positioned at an angle $\beta$, which varies as follows:

If the endless belt 1 carries load 13 in the curvilinear section b, the load causes the spring 14 to compress and the bearer 6 is thereby tilted down to a smaller angle $\beta$.

If the endless belt 1 runs empty, the spring 14 causes the bearer 6 to tilt up to a greater angle $\beta$.

Thus, the vertical position of the idlers 11 which support the return strand d of the endless belt in the curvilinear section b of the conveyor path and the variable angular position (variable angle $\beta$) of the bearers 6 with idlers 5 which support the carrying strand c of the endless belt in the curvilinear section b permit selecting the same optimum radius R of the curvature of the return strand d and of the carrying strand c for the endless belt 1 to steadily run true while making a horizontal turn.

In other respects, the endless belt conveyor described above operates essentially in the same manner as the conveyors known heretofore.

It is to be understood that the embodiment of the invention described herein will be construed as broadly as its scope will permit and other embodiments, including some in improved form, may be devised by those skilled in the art.

What is claimed is:

1. An endless belt conveyor having a path which has rectilinear and curvilinear sections disposed in a horizontal plane, said conveyor comprising: a frame; bearers uniformly distributed the length of said frame and mounted on said frame; idlers mounted in said bearers; an endless belt having load carrying and return strands which are supported by said idlers; the idlers which support said return strand of said endless belt in said curvilinear sections of the conveyor path being positioned with their axes extending vertically so as to permit a decrease in the radius of turn of said return strand of said endless belt in said curvilinear section of the conveyor path; the idlers which support said return strand of said endless belt in the transition portion of the conveyor path between said rectilinear and curvilinear sections thereof being positioned so as to have their axes inclined to the horizontal, the inclination angle of the idlers progressively increasing from zero to 90°, whereby said endless belt is gradually turned from a horizontal into a vertical position; and said bearers with said idlers mounted therein to support said load carrying strand of said belt within said curvilinear sections thereof being disposed so as to be inclined away from the center of the curvilinear section of the conveyor path.

2. An endless belt conveyor as claimed in claim 1, wherein the idlers which support said return strand of the endless belt in the transition portion of the conveyor path between the rectilinear and curvilinear sections thereof are progressively inclined towards the center of the curvilinear section in order to enable the conveyor belt face which is not exposed to the load to contact the idlers disposed in the vertical position.

3. An endless belt conveyor as claimed in claim 1, further comprising a flexible element which connects the inward end of each bearer, the end nearer the center of the curvilinear section of the conveyor path, to said conveyor frame thereby permitting a up and down movement; and a horizontal pivot which connects the outward end of each bearer, the end remote from the center of the curvilinear section of the conveyor path, to said conveyor frame so that the angular position of each bearer can be changed in a vertical plane within the angle of repose of the load being handled in order to keep the load carrying strand of the endless belt steadily running true on the supporting idlers in the curvilinear sections of the conveyor path with a radius of curvature below 500 m.

* * * * *